(12) United States Patent
Ito et al.

(10) Patent No.: US 7,339,768 B2
(45) Date of Patent: Mar. 4, 2008

(54) MAGNETIC HEAD DEVICE AND LINEAR TAPE DRIVE INCLUDING A TWIN BIMODAL TYPE ACTUATOR AND A DAMPENING STRUCTURE

(75) Inventors: Yoshihiko Ito, Miyagi Prefecture (JP); Hirohisa Koga, Kanagawa Prefecture (JP); Takashi Abe, Miyagi Prefecture (JP); James S. Anderson, Hugo, MN (US); Denis Langlois, River Falls, WI (US)

(73) Assignees: Imation Corp., Oakdale, MN (US); Sony Corporation, Tokyo (JP)

( * ) Notice: Subject to any disclaimer, the term of this patent is extended or adjusted under 35 U.S.C. 154(b) by 412 days.

(21) Appl. No.: 11/041,900

(22) Filed: Jan. 24, 2005

(65) Prior Publication Data
US 2005/0185344 A1 Aug. 25, 2005

(30) Foreign Application Priority Data
Jan. 29, 2004 (JP) ............................. 2004-022119

(51) Int. Cl.
*G11B 5/55* (2006.01)
(52) U.S. Cl. .................................... 360/261.1; 360/291
(58) Field of Classification Search ..... 360/291–291.3, 360/292, 291.9, 261.1–261.3
See application file for complete search history.

(56) References Cited
U.S. PATENT DOCUMENTS
4,441,128 A * 4/1984 Ohba et al. .................. 360/75

5,438,469 A * 8/1995 Rudi .......................... 360/291
5,500,777 A   3/1996 Hasegawa et al.
5,883,760 A   3/1999 Yamada et al.

OTHER PUBLICATIONS

U.S. Appl. No. 11/041,511, filed Jan. 24, 2005, entitled "Magnetic Head Device and Linear Tape Drive".
U.S. Appl. No. 11/051,371, filed Feb. 3, 2005, entitled "Piezoelectric Crystal Actuator and Techniques for Hysteresis Reduction".
U.S. Appl. No. 11/062,224, filed Feb. 18, 2005, entitled "Techniques for Adjusting for Actuator Non-Linearities in A Data Storage System".
Office Action dated May 10, 2007 for U.S. Appl. No. 11/041,511, 10 pages.

* cited by examiner

*Primary Examiner*—A. J. Heinz
(74) *Attorney, Agent, or Firm*—Shumaker & Sieffert, P.A.

(57) ABSTRACT

In general, the invention provides a magnetic head device and linear tape drive that widen the high frequency side of the servo range. In particular, the invention provides a magnetic head device comprising a magnetic head chip with multiple magnetic elements arranged for recording or playback of multiple tracks and a fine positioning structure that uses a bimodal construction that may widen the high frequency side of the servo range by increasing the resonant frequency of the magnetic head chip including the tracking structure and lowering the Q value of the resonance point. In addition, the invention includes a damping structure suitable for the fine positioning structure that improves high speed response by widening the range in which the magnetic head device can be used for a servo. The magnetic head device may use a linear tape drive method.

20 Claims, 16 Drawing Sheets

MAGNETIC HEAD DEVICE AND LINEAR TAPE DRIVE INCLUDING A TWIN BIMODAL TYPE ACTUATOR AND A DAMPENING STRUCTURE

TECHNICAL FIELD

The invention relates to magnetic data storage media and, more particularly, to magnetic heads and linear tape drive devices for reading and writing data to such media.

BACKGROUND

The increase in the amount of data handled by, for example, computer systems has lead to demands for data storage back up devices that use magnetic tape. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers. Increasing linear recording density or track density (TPI: Track Per Inch) is the key to improving memory capacity of magnetic recording tape systems which use linear magnetic tape with multiple recording tracks in the lengthwise direction.

One type of data storage system is a linear tape drive. Many linear tape drive systems use a track method for writing data to the tape and reading data from the magnetic tape. Specifically, multiple servo bands extend along the lengthwise direction of the magnetic tape across the width of the tape. Multiple data bands are formed between the servo bands. The data bands in the lengthwise direction of the magnetic tape have many parallel data tracks.

Magnetic tape is used to record and replay multiple data tracks simultaneously from the selected data band using a multi-channel magnetic head. The magnetic head includes two rows of recording and playback magnetic head elements which are combinations of multiple recording magnetic head elements and playback magnetic head elements arranged across the width of a track. The distance between the recording and reproducing magnetic head elements in each row matches the spacing of the data tracks between data bands. Both ends of the rows of recording and playback magnetic head elements have a playback magnetic head element that reads servo signals from the servo band on both sides of a data band during recording and playback. The servo signals are used to locate the recording and playback magnetic head element.

Generally, the magnetic tape moves in round trips across the magnetic head. Different data tracks can be written or read by moving the magnetic head a predetermined amount across the width of the tape. During recording, whichever way the tape is moving, the corresponding track is recorded by a recording magnetic head element which is in a row on the leading side of the magnetic tape each time the magnetic tape is transferred. This recording condition is monitored by playback magnetic head elements in a row on the trailing side. During playback, recorded data signals are reproduced by any playback magnetic head elements in two rows.

During recording and playback, servo signals are read from the track by playback magnetic head elements on both ends of the row of magnetic head elements. Servo bands are located on both sides of the data band where recording and playback is done. These servo bands control the location of the magnetic head which transfers data from the magnetic head to the data track.

For example, linear tape open (LTO) drives are representative of linear tape product and are designed to respond to demand for higher track density while also providing a high range tracking servo for following at an increased speed. LTO drives have a rough positioning system which selects the proper track, and a fine positioning system which uses a servo for position control. Rough positioning is required so that the servo can cover a wider area at high speed because of the higher track density of high density linear tape.

The fine tracking actuator for a linear tape drive is typically a voice coil motor (VCM). However, the resonant frequency of the VCM is usually a lower frequency, such as 200 Hz, and has a narrow servo range. In general, the servo range of the actuator is limited by the resonant frequency of the actuator itself. Consequently, increasing the resonant frequency of the actuator is required for increasing the range.

When the resonant frequency is close to the normal range, disturbances, such as noise excite the head at this resonant frequency. Therefore, it is often necessary to lower the Q value that indicates the sharpness of the resonant peak. However, this has failed to attain a sufficient servo range. As an alternate method, the use of a fine positioning structure that uses a bimodal construction made of laminated piezoelectric elements has been suggested. This fine positioning system has a higher resonant frequency compared to the VCM and can widen the servo range. However, the success of the fine positioning structure has further increased the demand for an even higher servo range.

SUMMARY

In general, the invention provides a magnetic head device and linear tape drive that widen the high frequency side of the servo range. In particular, the invention provides a magnetic head device comprising a magnetic head chip with multiple magnetic elements arranged for recording or playback of multiple tracks and a fine positioning structure that uses a bimodal construction that may widen the high frequency side of the servo range by increasing the resonant frequency of the magnetic head chip including the tracking structure and lowering the Q value of the resonance point. In addition, the invention includes a damping structure suitable for the fine positioning structure that improves high speed response by widening the range in which the magnetic head device can be used for a servo. The magnetic head device may use a linear tape drive method.

As described herein, the magnetic head may comprise a multi channel magnetic head chip with multiple magnetic head elements, a tracking structure, and a damping structure. The tracking structure may include a twin bimodal type actuator comprising a pair of bimodal elements that are positioned facing each other. The magnetic head chip is placed between dislocated ends of the pair of bimodal elements of the actuator and is mechanically bonded to the pair of bimodal elements. By applying a tracking control signal to the pair of symmetrical bimodal elements, a tracking motion that displaces the magnetic head chip is produced, for example, in the track width direction. The damping structure may include a section that holds visco-elastic materials, and a damping body that is mechanically connected to the magnetic head chip and is inserted in the visco-elastic materials. The damping structure suppresses vibration of the magnetic head due to shear stress between the visco-elastic material and damping body.

The linear tape drive device uses linear tape having multiple magnetic tracks that extend in the lengthwise direction formed across the width of a magnetic tape. In addition, the linear tape drive device comprises a tape cassette about which the tape is wound, a magnetic head as previously described, and a magnetic tape guide which guides the magnetic tape drawn from the tape cassette to the magnetic head. The damping structure of the magnetic head serves to suppress vibrations of the linear tape drive device due to shear stress between the visco-elastic material and damping body.

In one example, the invention provides damping for the magnetic head and linear drive using a damping structure comprising damping bodies placed on both ends of the direction of the multi channels of the magnetic head chip either in opposed or non-opposed mode. The invention provides directionally dependant damping for the magnetic head and linear drive by using a damping structure where the shear stress between the damping body and the visco-elastic material is different in directions other than the displacement direction of the damping body corresponding to the displacement direction of the magnetic head chip.

The motion of the magnetic head and linear drive is controlled to a specific direction by a damping structure having a displacement regulating step that limits the direction of the displacement of the damping body in a predetermined direction. For example, the displacement of the magnetic head and linear drive may be controlled by a displacement regulating step of the damping structure comprising grooves or projections formed on walls along the displacement direction of the damping body that contacts the visco-elastic material. Thus, shear stress is increased in directions other than the displacement direction to regulate the displacement of the damping body. In this manner, the angular displacement of the magnetic head and linear drive may be restricted by the displacement direction regulating step. Specifically, the displacement of the magnetic head and linear drive in the perpendicular direction is restricted by the displacement direction regulating step.

In another example, the invention provides a magnetic head for which damping properties or the amount of damping can be easily adjusted. The magnetic head follows sideways movement of tape with multiple tracks in the lengthwise direction. The magnetic head comprises twin bimodal actuators that are displaced by applying voltage and includes a pair of bimodal elements positioned to face each other. The head chip is mechanically bonded between the free ends of the pair of bimodal elements. A damping step is set up at the fixed ends of the pair of bimodal actuators and the head chip. Head damping is achieved by contact between the visco-elastic material and damping body.

The damping body can be used to easily adjust the damping properties. In particular, the damping body comprises a damping bar which projects from both ends of the head chip on the same line as the center of gravity of head chip. The damping property adjusting step has a movable holder that holds the visco-elastic materials that come in contact with the damping body. The contact area between the visco-elastic material and damping body may also be adjusted. In addition, the damping body includes damping plate attached to the opposite side of the head chip from the magnetic head. The movable holder can be moved along the surface of the damping plate. For example, the movable holder can be moved in the axial direction of the damping bar.

In one embodiment, the invention is directed to a magnetic head device for recording and playing back information on magnetic tape comprising a multi channel magnetic head chip, a tracking structure, and a damping structure. The multi channel magnetic head chip includes multiple magnetic head elements. The tracking structure comprises a twin bimodal type actuator wherein the twin bimodal type actuator includes a pair of bimodal elements that are positioned to face each other, wherein the magnetic head chip is placed between the free ends of the pair of bimodal elements and is mechanically bonded to the pair of bimodal elements, and wherein application of a tracking control signal to the pair of bimodal elements displaces the magnetic head chip. The damping structure comprises a structure that holds visco-elastic materials and a damping body inserted in the visco-elastic materials and that is mechanically connected to the magnetic head chip.

In another embodiment, the invention is directed to a linear tape drive system that uses linear tape with multiple magnetic tracks extending in the lengthwise direction formed across the width of a magnetic tape comprising a tape cassette around which the magnetic tape is wound, a magnetic head device, a magnetic tape guide that guides the magnetic tape drawn from the tape cassette to the magnetic head device, and a damping structure. The magnetic head device comprises a multi channel magnetic head chip with multiple magnetic head elements, a twin bimodal type actuator, and a damping comprising a structure that holds visco-elastic materials and a damping body inserted in the visco-elastic materials that is mechanically connected to the magnetic head chip. The twin bimodal type actuator includes a pair of bimodal elements that are positioned to face each other. The magnetic head chip is placed between the free ends of the pair of bimodal elements and is mechanically bonded to the pair of bimodal elements and the application of a tracking control signal to the pair of bimodal elements displaces the magnetic head chip. The damping structure comprises a structure that holds visco-elastic materials and a damping body inserted in the visco-elastic materials and that is mechanically connected to the magnetic head chip.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
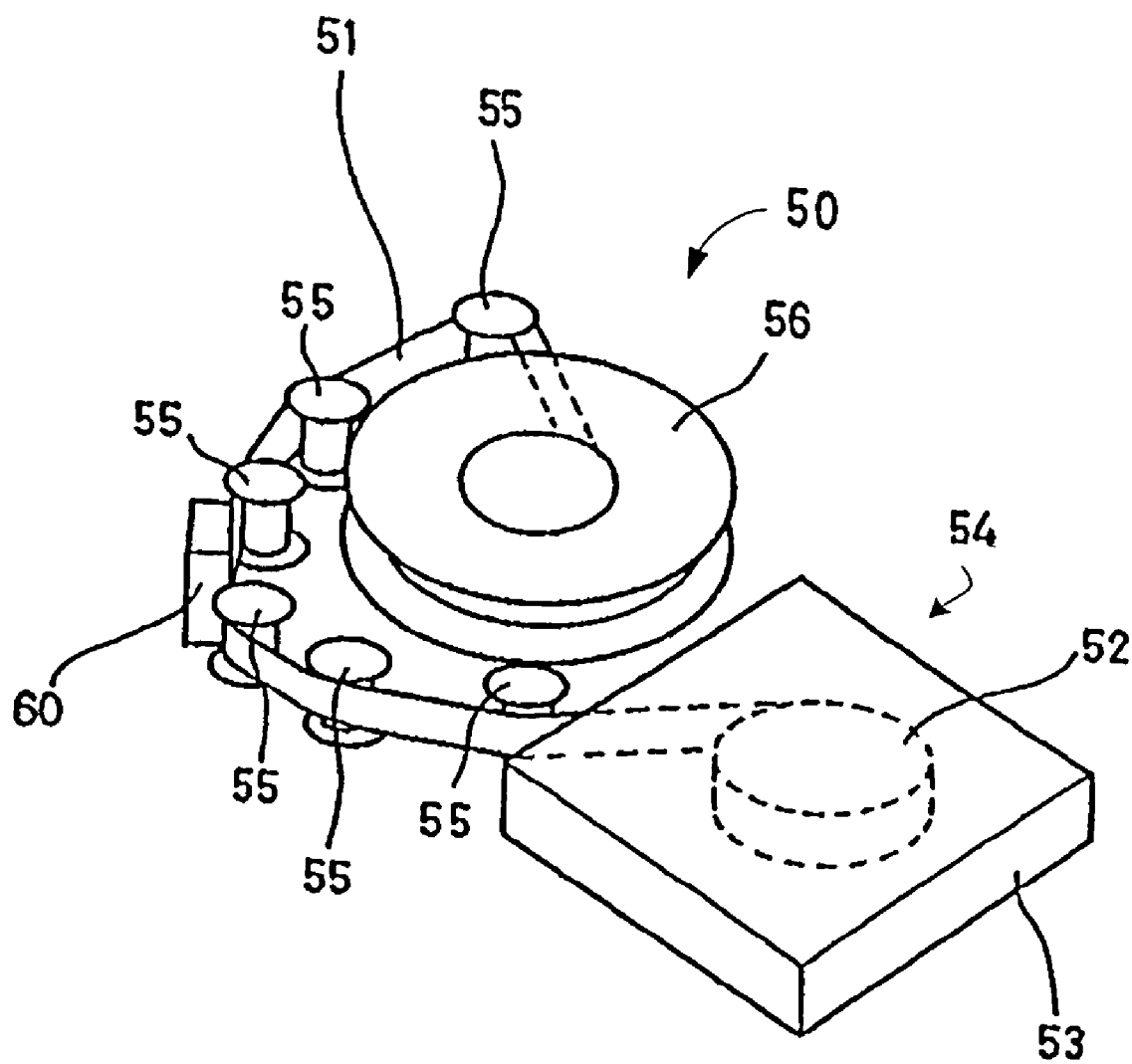
FIG. 1 illustrates a linear tape drive device comprising a magnetic head with many magnetic head elements that is supported by a twin bimodal actuator in accordance with an embodiment of the invention.

FIG. 1 illustrates a linear tape drive device 50 in accordance with an embodiment of the invention. Linear tape drive device 50 comprises a tape cassette 54 having a tape case 53 that holds a first reel 52 around which magnetic tape 51 is wound, a magnetic head 60, and a magnetic tape guide 55 which has multiple guide pins or guide rollers which guide magnetic tape 51 drawn from first reel 52 within tape case 53 to the magnetic head 60.

First reel 52 within tape case 53 is paired with a second reel 56 around which magnetic tape 51 is wound outside tape case 53. Between first and second reel 52 and 56, magnetic tape 51 makes a round trip through the magnetic head 60.

Figure 18:
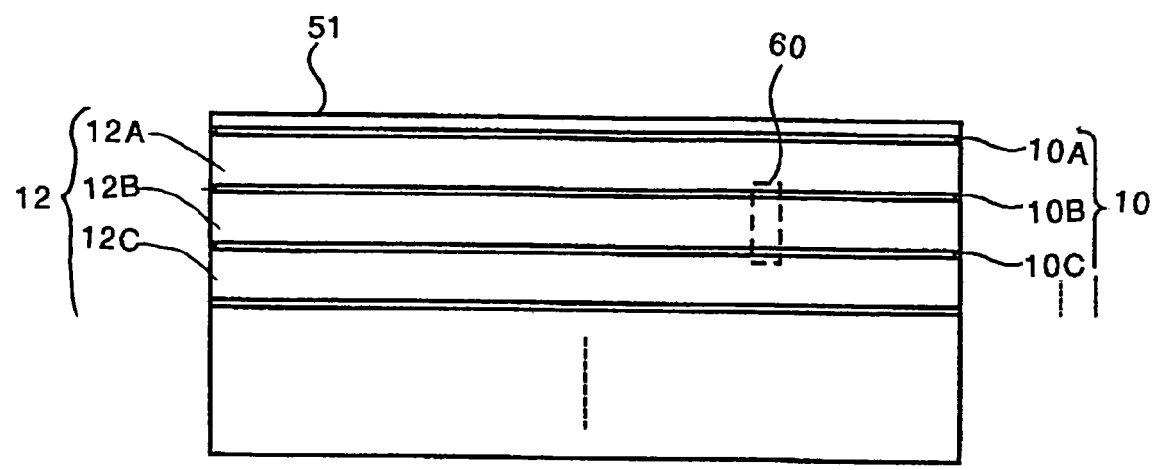
FIG. 18 illustrates the tape format of the linear tape drive device in FIG. 1.

As shown in FIG. 18, magnetic tape 51, for example, has multiple servo tracks 10A-10C (collectively referred to as "servo tracks 10"), across the width of tape 51 which extend along the lengthwise direction of magnetic tape 51. Multiple data bands 12A-12C (collectively referred to as "data bands 12"), are formed between servo tracks 10. Each of data bands 12 may have several parallel data tracks, for example, 16, 32 or 96 tracks, arranged lengthwise along magnetic tape 51.

Figure 19:
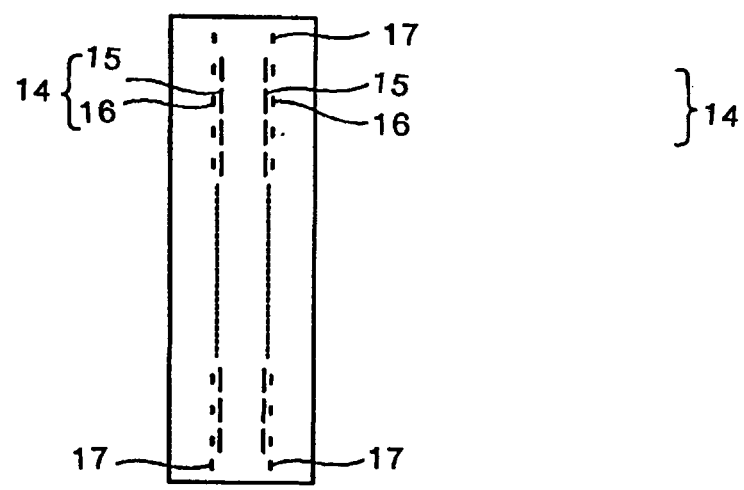
FIG. 19 illustrates a pattern of magnetic head elements of a magnetic head chip in accordance with an embodiment of the invention.

In general, linear tape drive device 50 comprises magnetic head 60, as shown in FIG. 19, which includes a magnetic head chip with multiple magnetic head elements arranged for recording or playback of multiple tracks. The magnetic head chip is supported by a twin bimodal actuator. The twin bimodal actuators provide fine positioning of the magnetic head chip based on a control signal from the track.

The magnetic head chip as multiple recording and playback magnetic head elements 14. Recording elements 15 and playback elements 16 are arranged in two rows across the track width as shown in FIG. 19. In addition, the magnetic head elements include servo playback elements 17 that are formed on both ends of each row of magnetic elements 14, also show in detail in FIG. 19.

External sources of vibration are damped rapidly since damping is provided by shear stress in a visco-elastic material held in a damping structure. A damping body that is mechanically connected to the magnetic head chip may be inserted into the visco-elastic materials. When the shear stress between the damping body and the visco-elastic material is directional, it is possible to perform different damping depending on the direction of displacement reliability. Moreover, since the damping structure limits the displacement direction of the damping body to a predetermined direction, it is possible to avoid moving and shaking the damping body. Thus, damping can be performed reliably in a predetermined direction.

In order to regulate the displacement direction of the damping structure, grooves or projections are formed along walls of the damping body in the displacement direction which contact the visco-elastic material. In addition to limiting the displacement direction of the damping body, the grooves or projections also cause the shear stress to be directionally dependent.

By using a displacement direction regulating step to prevent displacement in unnecessary directions, such as angular displacement, displacement perpendicular to the tape, or rotation; it is possible to avoid unnecessary vibration and unnecessary resonance caused by limitations in part accuracy, assembly, and the like in the unnecessary directions.

In addition to the rapid damping effect, the resonant frequency is also greatly increased. Thus, linear tape drive device 50 may experience high speed tracking with fine positioning because the increase in the resonant frequency also increases the range of the tracking servo.

Figure 2:
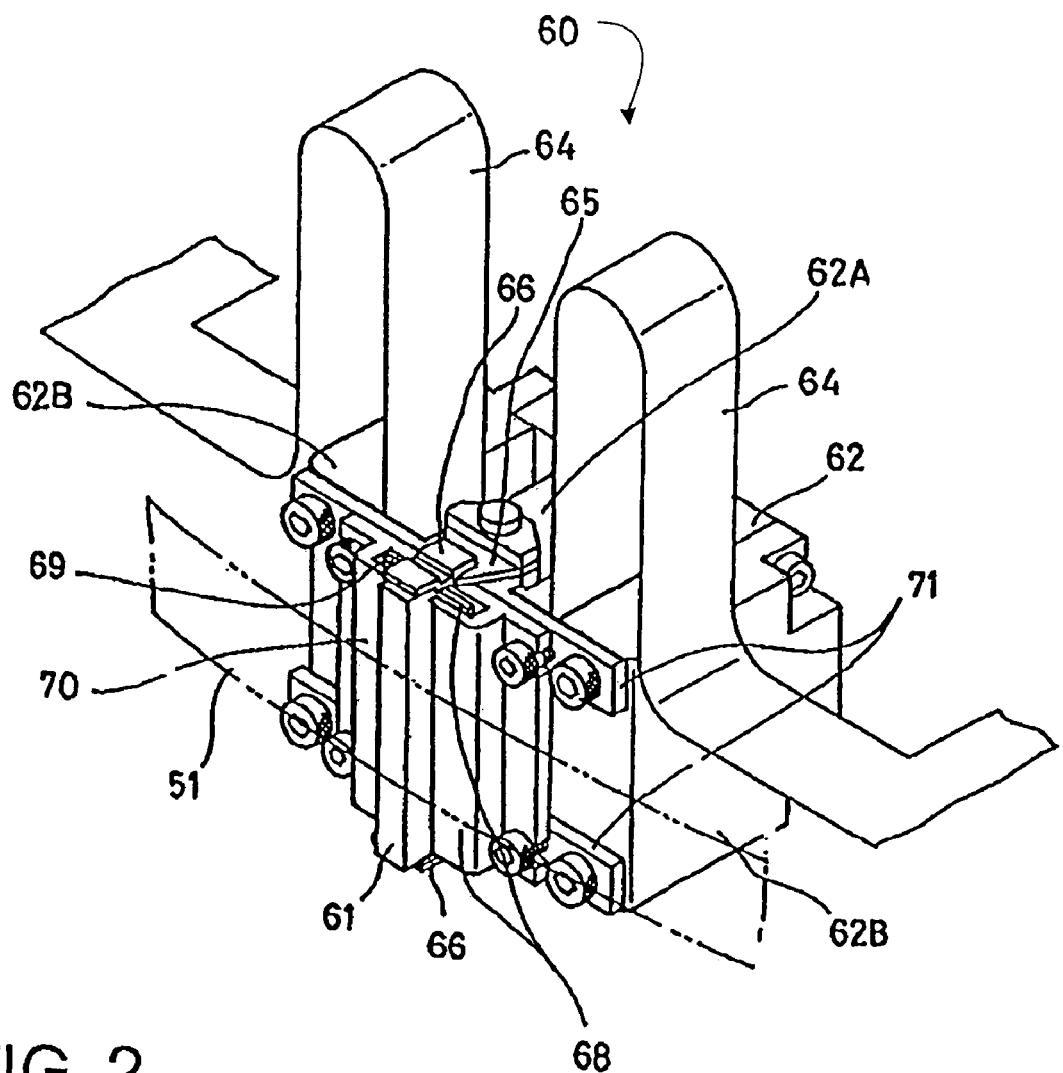
FIG. 2 is a perspective view of the magnetic head of the linear tape drive device in FIG. 1.
Figure 3:
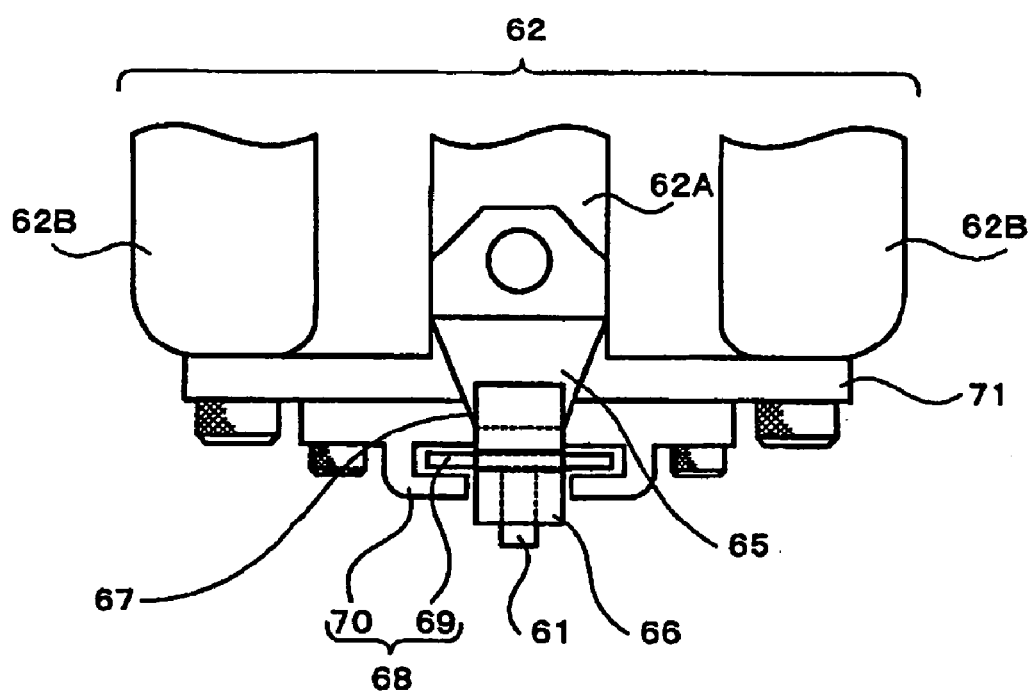
FIG. 3 is a top view of the magnetic head of the linear tape drive device of FIG. 1.
Figure 4:
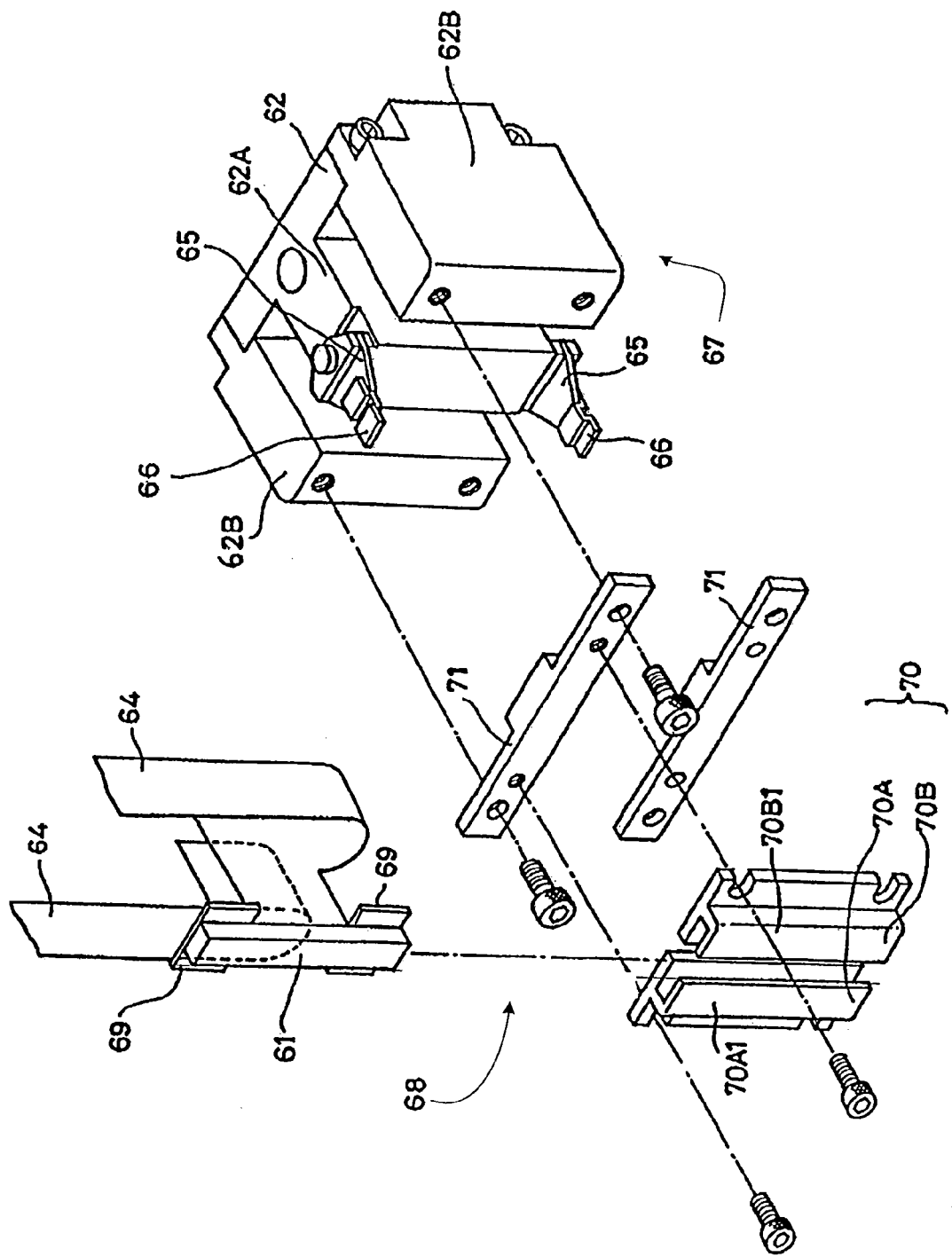
FIG. 4 is an exploded view of the magnetic head of the linear tape drive device of FIG. 1.
Figure 5:
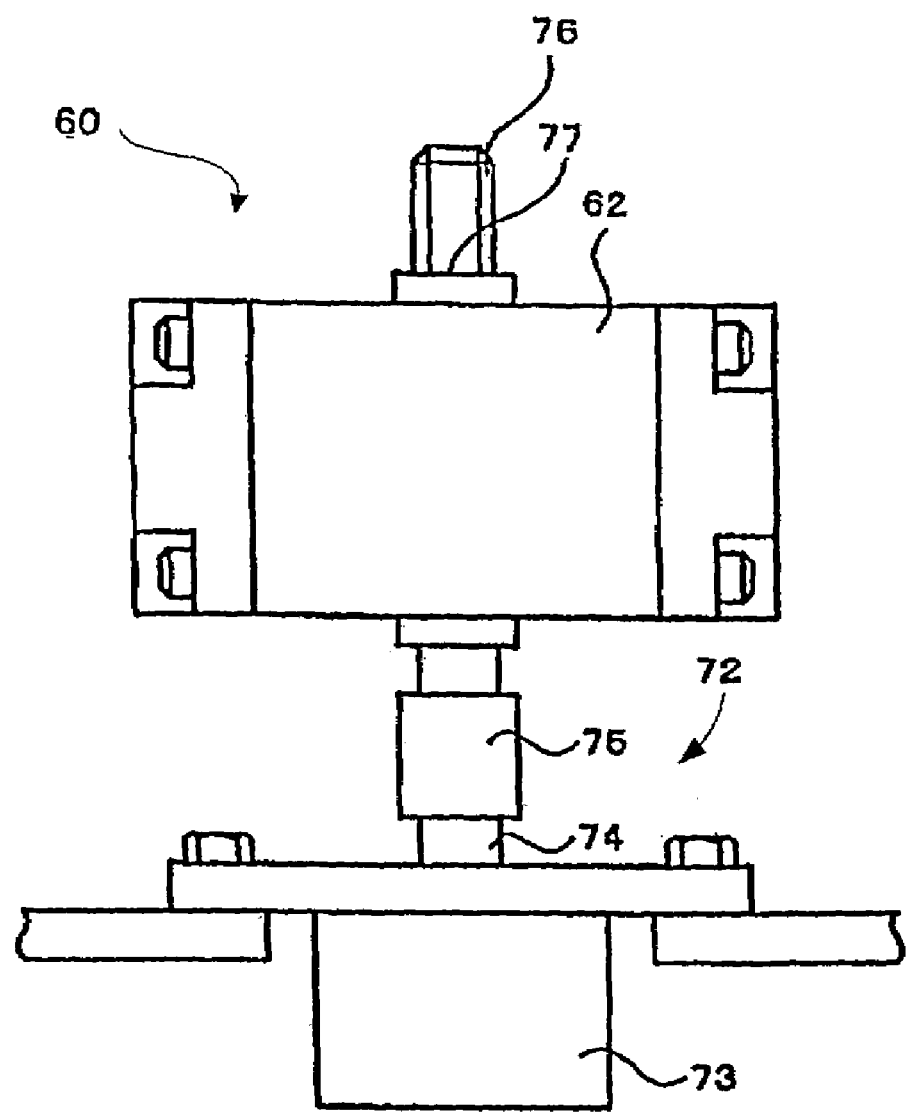
FIG. 5 is a rear view of the magnetic head of the linear tape drive device of FIG. 1.

FIG. 2 is a perspective view of magnetic head 60 of linear tape drive device 50. FIG. 3 is a top view of magnetic head 60 of linear tape drive device 50. FIG. 4 is an exploded view of magnetic head 60 of linear tape drive device 50. FIG. 5 is a rear view of magnetic head 60 of linear tape drive device 50.

Magnetic head 60 comprises magnetic head chips 61 held by a magnetic head structure 62. Magnetic head structure 62 includes an E shaped block with a center part 62A with magnetic head chips 61 on top and walls 62B at a predetermined distance on both sides clearly shown in FIGS. 3 and 4.

Again, magnetic head chip 61 has multiple recording and playback magnetic head elements 14. Recording elements 15 and playback elements 16 are arranged in two rows across the track width as shown in FIG. 19. In addition, magnetic head chips 61 include servo playback elements 17 that are formed on both ends of each row of magnetic elements 14, also show in detail in FIG. 19.

The magnetic head element spacing is determined by the data band spacing on tape 51. As magnetic tape 51 repeatedly runs past magnetic head 60, magnetic head structure 62 moves across the width of magnetic tape 51 by a rough positioning structure that will be described in detail. Each data track is recorded and replayed in order.

Figure 6:
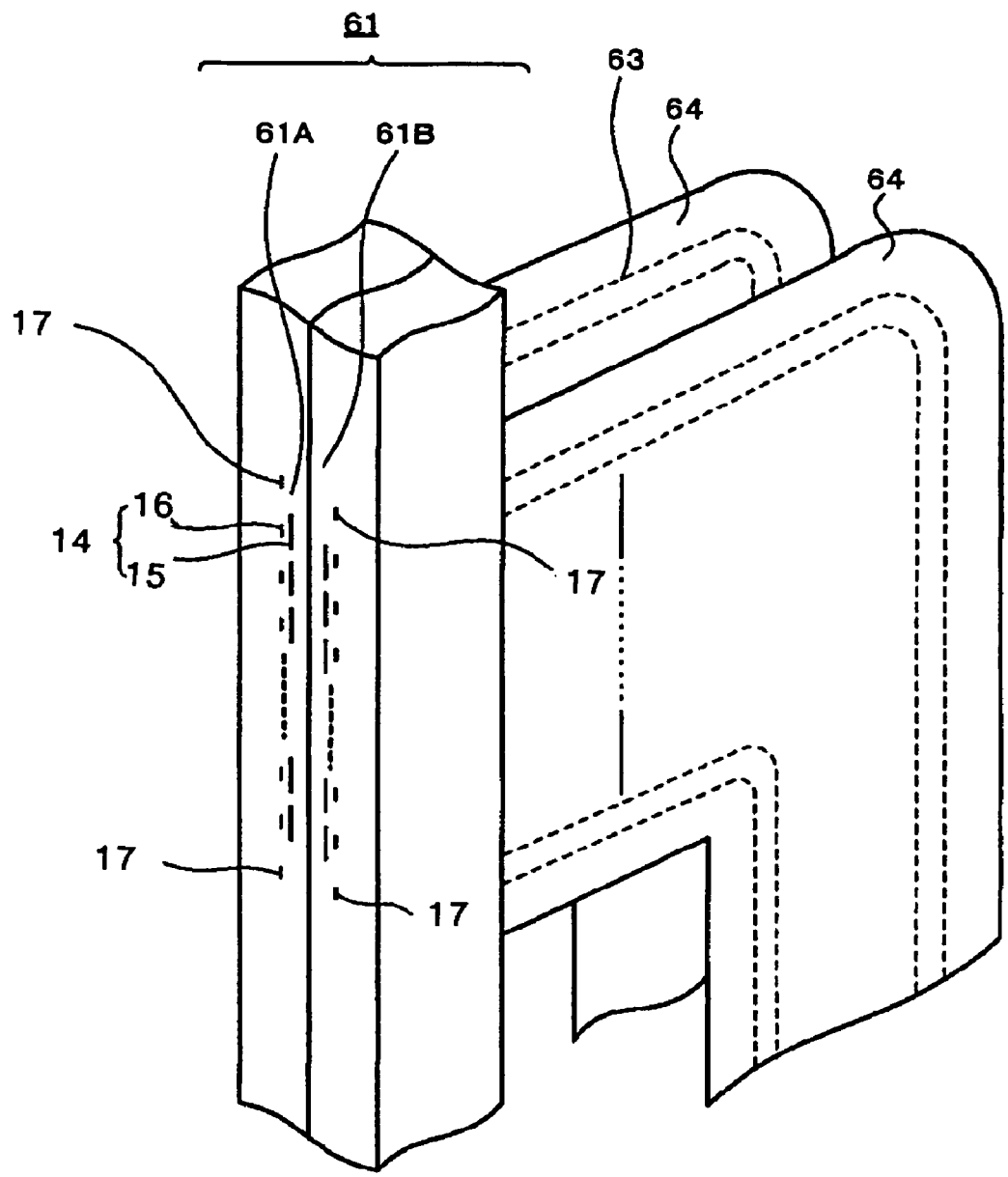
FIG. 6 is a cross-section view of the magnetic head chip of the magnetic head in FIG. 2.

FIG. 6 is a cross-section view of magnetic head chip 61 of magnetic head 60. Regardless of the direction that magnetic tape 51 is running, recording of the data track by recording element 15 of the recording and playback head element 14 in one row is monitored by the playback head element 16 of the recording and playback magnetic head element 14 that is positioned on the other side of the data track.

In magnetic head chip 61, magnetic head elements 14 in each row include magnetic head chip elements 61 that are bonded and united. For example, a first row comprises magnetic head chip elements 61A that are bonded and united and a second row comprises magnetic head chip elements 61B that are bonded and united. In any case, a row of magnetic head chip elements 61 form thin film magnetic head elements of electromagnetic induction type that are laminated to form recording head elements 15 and playback head elements 17 for the servo signal which make up a magnetic resistance effect (MR) playback head and playback head element 16.

Magnetic head elements are formed by arranging playback heads 17 for the servo signal and recording and playback head elements 14 in the center of the magnetic head chip 61. A magnetic head chip may be longer than the width of magnetic tape 51. For example, when magnetic tape 51 is ½ inch wide, a magnetic head chip may be at least 1 inch wide or more. Using magnetic head chips 61 that are longer than the width of magnetic tape 51 allows uniform contact across the width of magnetic tape 51.

Each head chip element 61A of the magnetic head chip 61 is attached to a flexible substrate 64 by wires 63 from terminals on the magnetic head elements in back of the magnetic head chip 61. Flexible substrate 64 makes an L shaped pattern that is bent and extended in the track width direction as shown in FIG. 6.

As shown in FIG. 4, the magnetic head structure 62 comprises an E shaped block with a center part 62A with magnetic head chips 61 on top with walls 62B at a predetermined distance on both sides. The front center part 62A of magnetic head structure 62 has magnetic head chips 61 that are used by the fine positioning structure 67.

Fine positioning structure 67 includes a pair of bimodal elements 65 that are fixed to both sides of the center part 62A. The pair of bimodal elements 65 is placed at a distance corresponding to the total width of the track in the direction of the magnetic head chips 61 in the center section 62A of magnetic head structure 62.

In addition, one end of a flexible metal or resin connector 66 in a ⊃ shape is attached to the middle of center part 62A at the free end of the pair of bimodal elements 65. Also, as shown clearly shown in FIG. 2 and FIG. 3, both ends of magnetic head chip 61 are bonded between this pair of elastic connecting pieces 66. Accordingly, fine positioning structure 67 comprises twin bimodal type actuators where magnetic head chip 61 is constrained by the pair of bimodal elements 65.

Fine positioning structure 67, or tracking structure, is deformed by applying tracking control signals to the pair of bimodal elements 65 thereby moving magnetic head chip 61 minutely in the multi channel direction, i.e. the track width direction. Magnetic head elements 14 follow the corresponding data track.

Damping structure 68 is clearly shown in FIGS. 2-4. Damping structure 68 is attached to magnetic head chip 61 which is driven by the fine positioning structure 67. A damping body 69 is mechanically connected to both ends of magnetic head chip 61. A structure 70 that holds visco-elastic material is placed around damping structure 68.

FIGS. 2-4 also show a construction that restricts the motion of magnetic head chip 61 in the zenith direction. For example, the damping body 69 may comprise flat rectangle placed on a surface crossing the direction that forms the gap of the magnetic head element. Structure 70 that holds the visco-elastic material may form a flat space surrounding damping body 69.

Damping structure 68 can be assembled by the following steps. First, both ends of magnetic head chip 61 are attached to the free end of one of bimodal elements 65 fixed to magnetic head structure 62 by bases of resin connector 66. Second, both supporters 71 are screwed to the front side of symmetrical walls 62B. Next, retainers 70A and 70B of structure 70 are fixed along both supporters 71 by screws or a suitable fastening device so that damping body 69 is attached to magnetic head chip 61 and is inserted inside channels 70A1 and 70B1 of retainers 70A and 70B. A visco-elastic material, for example, silicone resin, is deposited between damping body 69 and the inner surface of retainers 70A and 70B of structure 70. Damping body 69 is then placed in contact with the visco-elastic material.

In addition, a flexible wiring substrate 64 extends from the back of magnetic head chip 61. For example, the L shaped extension described above curves in the cross web direction along the inner surfaces of both facing walls 62B of magnetic head structure 62. Also, flexible wiring substrate 64 extends around the upper ends of each of walls 62B in a U shape before exiting magnetic head structure 62.

Furthermore, magnetic head device 60 includes a rough positioning structure 72 that transfers magnetic head structure 62 across magnetic tape 51 as shown in FIG. 5. Magnetic head structure 62 can move across the track width without rotating thereby remaining centered in the direction across tape 51. Rough positioning structure 72 includes a drive section 73 such as a stepper motor attached to linear tape drive device 50. The rotation axis 74 of driving section 73 is placed, for example, across the track width. A lead screw and a connector 75 that interfaces with lead screw 76 form a connection between magnetic head structure 62 and rough positioning structure 72. For example, a hole 77 in magnetic head structure 62 accepts lead screw 76. By rotating the lead screw 76, which is attached to rotating axis 74 of drive section 73, magnetic head structure 62 is transferred across the track width by lead screw 76. Consequently, magnetic head device 60 can be roughly positioned and can be moved across the track width by structure 72. As a result, structure 72 can bring magnetic head chip 61 to a predetermined position to read a selected data band. Each recording and playback magnetic head element 14 can be moved to the desired data track.

At this point, the playback head elements 17 for the servo signal are positioned on both sides of the selected data track. Accordingly, the playback head elements 17 of this servo signal reads the servo signal. A tracking control signal voltage acquired from detection of the servo signal may be applied to both bimodal elements 65 of the twin bimodal actuator of fine positioning system 67. The voltage applied to both bimodal elements 65 causes magnetic head chip 61 to move slightly across the track width, and the magnetic recording and playback head element 14 can be made to follow each data track.

Accordingly, magnetic head chip 61 is moved across the track width by fine positioning system 67 by the twin bimodal actuator. By using this twin bimodal actuator, magnetic head chip 61 can reliably perform fine tracking across the track width. Furthermore, magnetic head chip 61 is connected to the free end of the pair of bimodal elements 65 through an elastic connector 66. Displacement occurs at the free end by applying a control signal voltage to bimodal element 65 thereby causing bimodal elements 65 to bend. As a result, magnetic head chip 61 moves minutely across the track width. Since the elastic connector 66 can bend slightly in the opposite direction from bimodal elements 65, the arc drawn by the free end of bimodal elements 65 can be mitigated by reverse bending of the elastic connector 66. Thus, magnetic head chip 61 can be moved in a straight line across the track width so that the movement remains in the same plane. The distance between head chip 61 and magnetic tape 51 can be uniform as fine positioning system 67 moves the magnetic head structure 62 across magnetic tape 51.

Damping structure 68 for magnetic head chip 61, which is displaced slightly by the fine positioning system 67, is an important feature of the invention. Damping structure 68 includes damping body 69 attached to the magnetic head chip 61. In particular, damping structure 68 is immersed in a visco-elastic material held within channels 70A1 and 70B1 of structure 70. When damping body 69 is moved slightly across the track width, shear stress is generated in damping body 69 by the visco-elastic material 80-that reduces vibration. Accordingly, vibration of magnetic head chip 61 is controlled by damping structure 68.

Figure 8:
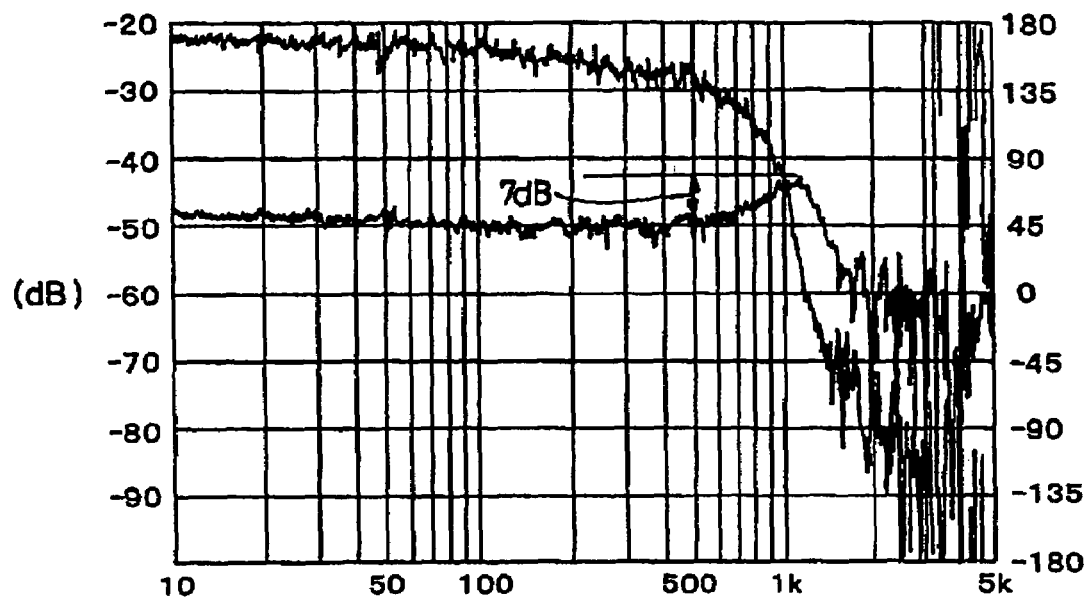
FIG. 8 is a graph illustrating frequency characteristics of the magnetic head chip of the magnetic head of FIG. 2.
Figure 9:
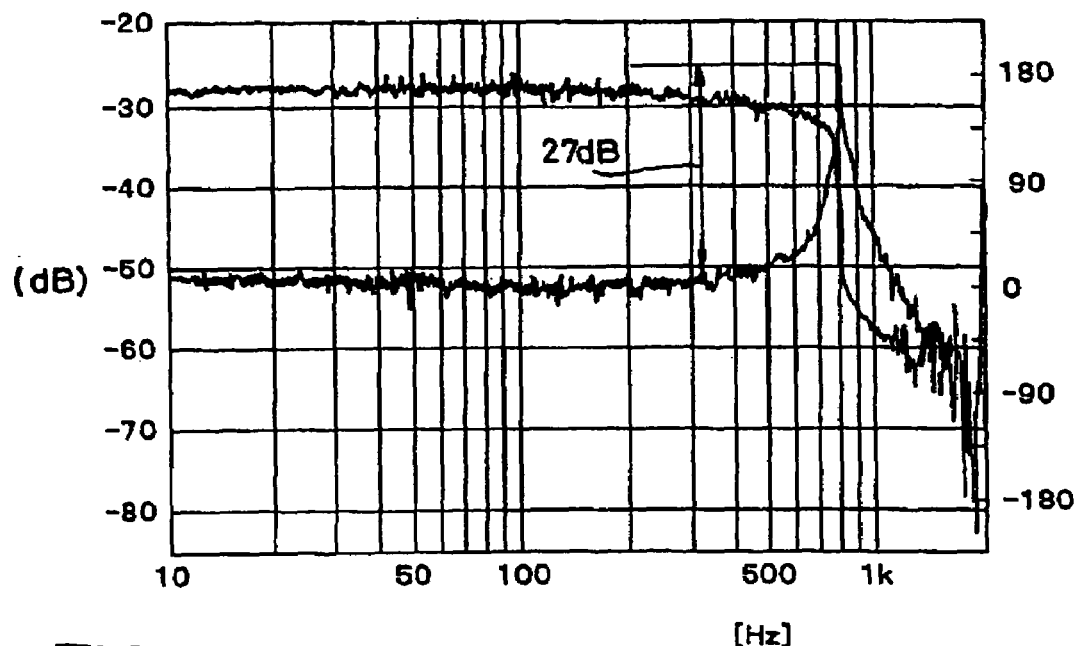
FIG. 9 is a graph illustrating frequency characteristics of a magnetic head chip without a damping structure for comparison to FIG. 8.

FIG. 8 is a graph illustrating frequency characteristics of magnetic head chip 61 of the magnetic head 60. FIG. 9 is a graph illustrating frequency characteristics of magnetic head chip 61 without damping structure 68. The resonant frequency of magnetic head chip 61 is 1.12 k, which is significantly higher than the resonant frequency, 803 Hz, in the prior art. In particular, the starting part of the resonance is mild, and its height is approximately 7 dB, which is much lower than 27 dB when the damping structure is not used, as shown in FIG. 9. Thus, the Q value is lowered. In other words, the servo bandwidth is wider and has a higher frequency compared to the case when damping structure 68 is not used (FIG. 9).

Figure 10:
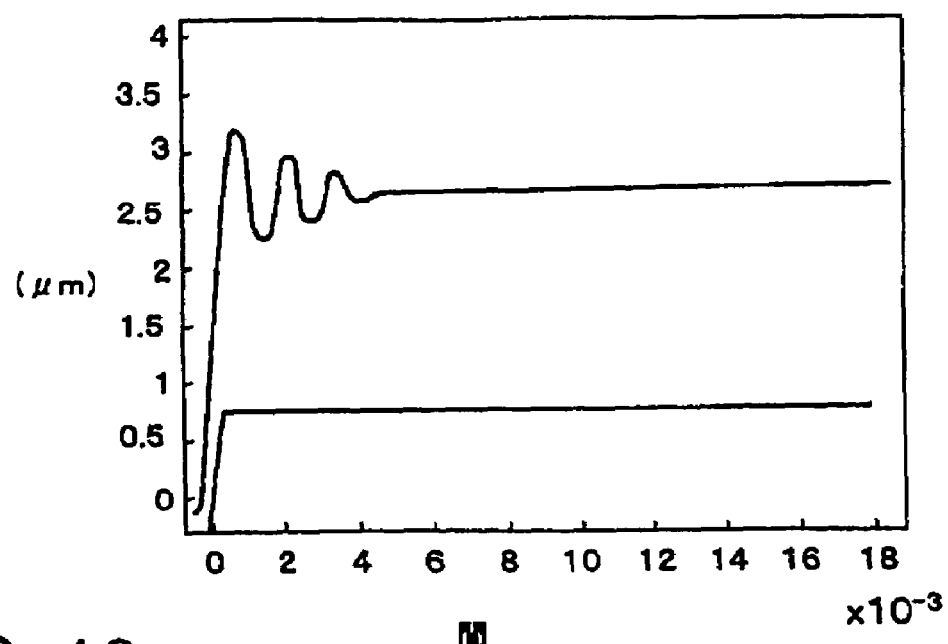
FIG. 10 is a graph illustrating vibration damping after a set input to the magnetic head chip of the magnetic head of FIG. 2.
Figure 11:
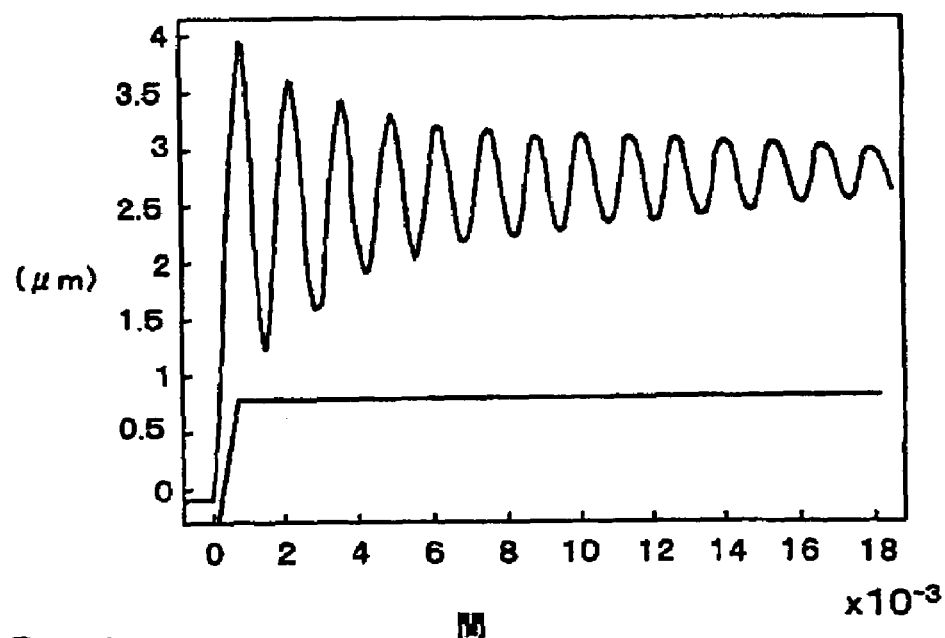
FIG. 11 is a graph illustrating vibration damping after a step input to the magnetic head chip of the magnetic head of FIG. 2 without a damping structure.

FIG. 10 also shows magnetic head structure 62 provides fast damping of vibration compared to the prior art. In addition, magnetic head structure 62 provides improved damping of vibration compared to the prior art even when damping structure 68 is not used as shown in FIG. 11.

Figure 12:
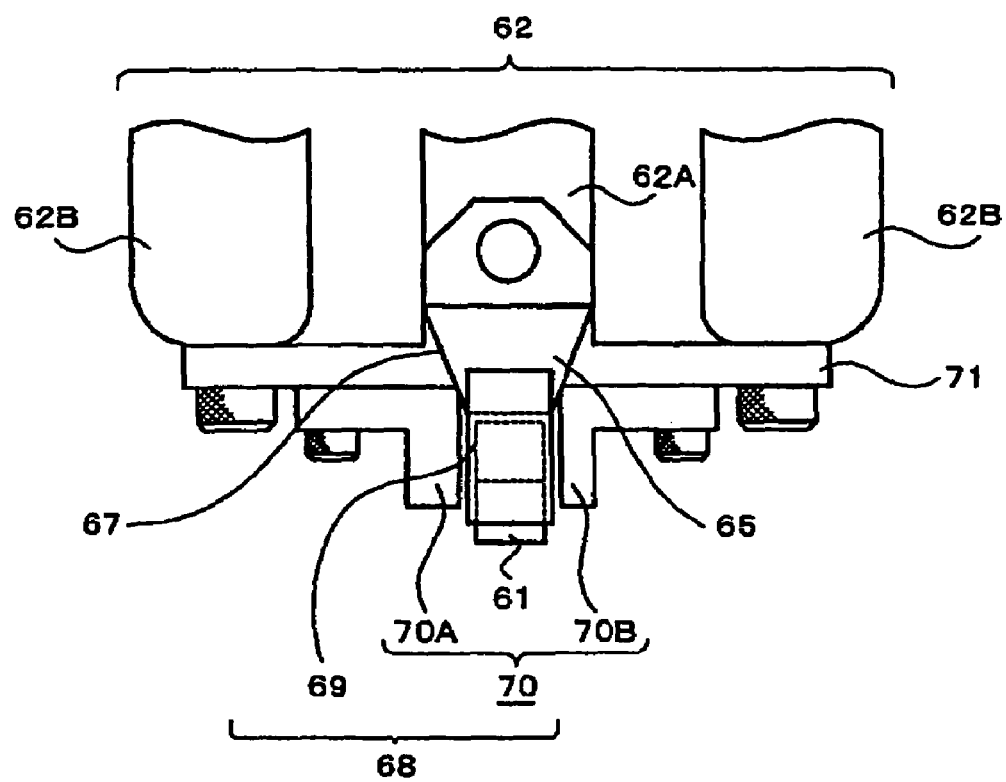
FIG. 12 is a top view of another example of the magnetic head of FIG. 2.
Figure 13:
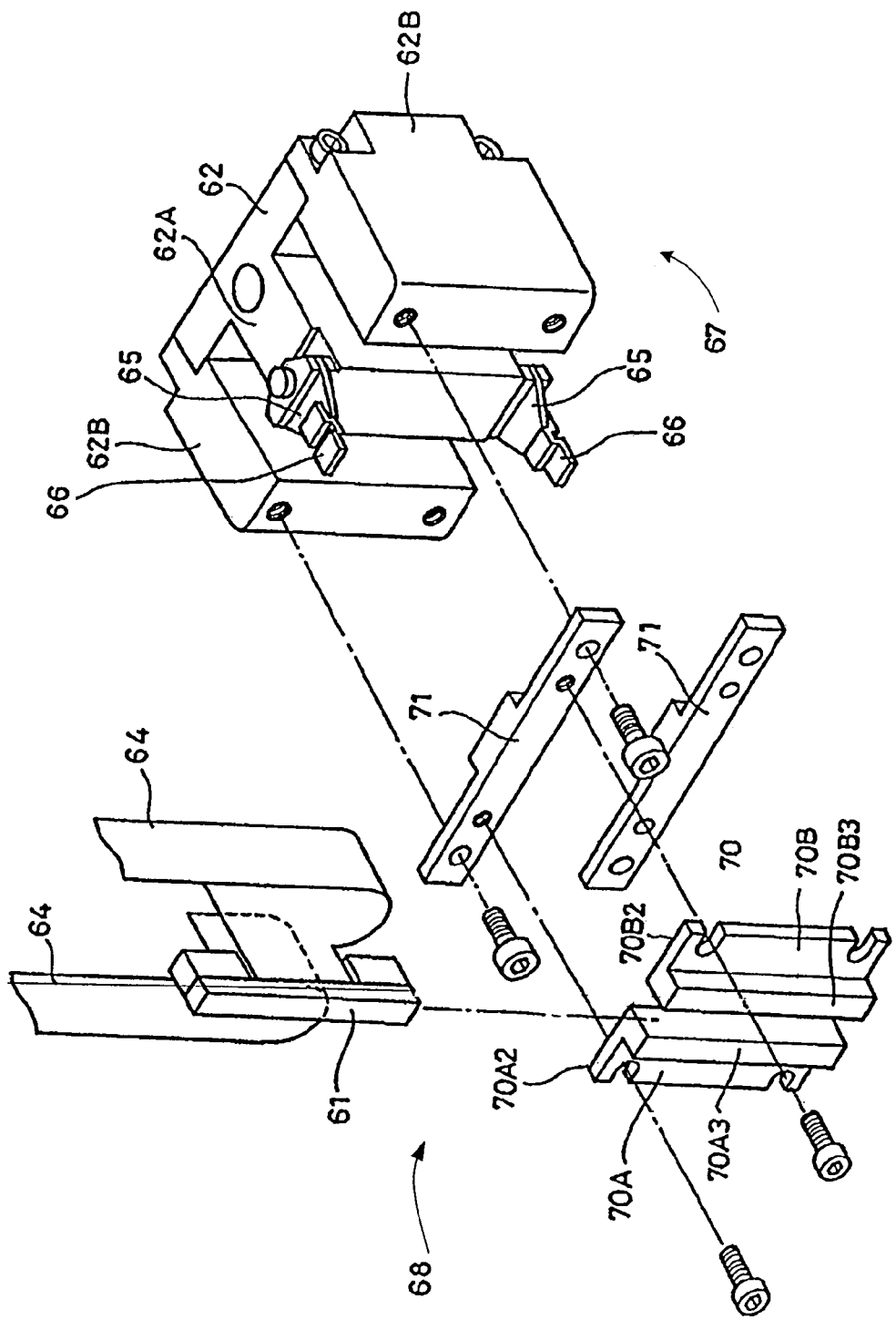
FIG. 13 is an exploded view of another example of the magnetic head of FIG. 2.

While FIGS. 2-4 illustrate an embodiment of the invention that restricts motion in the zenith direction another embodiment of the invention that restricts motion in the perpendicular is illustrated in FIG. 12 and FIG. 13.

FIG. 12 is a top view of magnetic head structure 62 that restricts motion in the perpendicular direction. FIG. 13 is an exploded view of magnetic head structure 62 that restricts motion in the perpendicular direction.

Notably, FIG. 12 and FIG. 13 illustrate magnetic head structure 62 having retainers 70A and 70B of structure 70 that are L shaped, rather than shaped as shown in FIGS. 2-4. However, the embodiment of magnetic head structure 62 in FIG. 12 and FIG. 13 also includes identical components as the embodiment of the invention shown in FIGS. 2-7. The identical components are referred to using the same reference numbers as used in FIGS. 2-7. Accordingly, the description of magnetic head structure 62 as shown in FIG. 12 and FIG. 13 includes features of the invention that remain unchanged for the purpose of brevity. For example, fine positioning structure 67 and rough positioning structure 72 are unchanged with respect to the embodiment of magnetic head structure 62 illustrated in FIGS. 2-7.

Again, magnetic head structure 62 in FIG. 12 and FIG. 13 includes L shaped retainers 70A and 70B that comprise structure 70 for holding the visco-elastic material. Elongated parts 70A2 and 70B2 of retainers 70A and 70B, respectively, are attached to supporters 71. Flat parts 70A3 and 70B3 of retainers 70A and 70B, respectively, are bent forward from elongated parts 70A2 and 70B2 to form the shape.

Damping body 69 extends in the direction of the differential magnetic gap, and may include, for example, a square plate aligned with the track width as shown in FIG. 12. Damping body 69 may be attached to both ends of magnetic head chip 61. Damping body 69 may be placed between flat parts 70A3 and 70B3 of retainers 70A and 70B, respectively. In addition, visco-elastic fills the gap between damping body 69 and flat parts 70A3 and 70B3.

Accordingly, since flat parts 70A3 and 70B3 are placed on both sides of damping body 69, motion of magnetic head chip 61 and damping body 69 perpendicular to magnetic tape 51 is restricted. Fine positioning structure 67 serves to dampen vibration as described previously. Specifically, fine positioning structure 67 dampens vibrations due to shear stress in the visco-elastic material caused by damping body 69. Thus, the resonant frequency is increased and the Q value is reduced allowing the servo range to be upgraded.

Figure 7A:
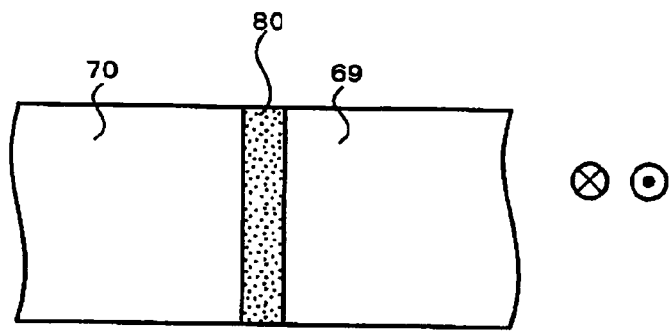
FIGS. 7A-7D illustrate visco-elastic material between surfaces of a damping body and a holder of the magnetic head of FIG. 2.
Figure 7B:
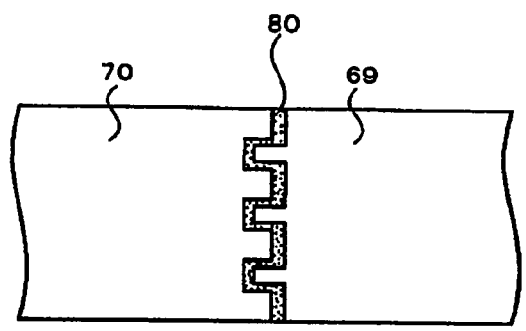
Figure 7C:
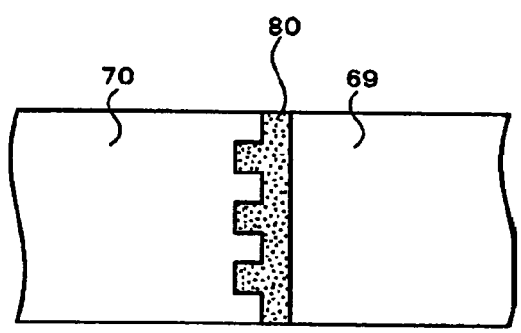
Figure 7D:
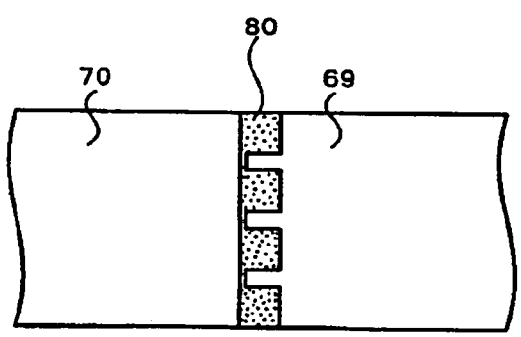

FIGS. 7A-7D illustrate visco-elastic material 80 between surfaces of damping body 69 and structure 70. Specifically, FIGS. 7B-7D illustrate different embodiments of the invention in which the surfaces of damping body 69 and structure 70 have grooves or projections that interface with each other and extend in the track width direction. In general, the grooves or projections may be formed in either damping body 69, structure 70, or both. The grooves or projections restrict the displacement of damping body 69 and therefore, also restrict the displacement of magnetic head chip 61. The shear stress can be made aniosotropic, i.e. the damping effect will be directional.

The surfaces of damping body 69 and structure 70, as shown in FIG. 7B, are mirror images of each other. In particular, the grooves or projections in the surfaces of damping body 69 and structure 70 are designed to interface with each other to restrict the displacement to directions other than the track width direction. Increasing the area of the surfaces of damping structure 69 and structure 70 by adding the grooves or projections allows the shear stress to be controlled to a predetermined value.

FIG. 7C shows grooves in the surface of structure 70 while FIG. 7D shows projections in the surface of damping body 69. In both cases, the grooves (FIG. 7C) and projections (FIG. 7D) extend in the direction of the track width and create anisotropic shear stress, i.e., shear stress along the grooves or projections and shear stress perpendicular to the grooves or projections. Grooves or projections in the surface of damping body 69 or structure 70, or both, allow adjustment of the damping effect for the magnetic head chip 61.

As shown in FIGS. 2-4, FIG. 12, and FIG. 13, a damping body 69 is placed on each ends of magnetic head chip 61. However, the pair of damping bodies does not have to be symmetric and depends on the shape and placement of magnetic head chip 61.

Magnetic head structure 62 includes many magnetic head elements arranged on magnetic head chip 61. The magnetic head elements perform recording or playback of magnetic tape 51 with multiple tracks. Magnetic head structure 62 is controlled by a twin bimodal actuator controlled by tracking signals from the data track on magnetic tape 51.

An important feature of magnetic head 60 is damping structure 68 that serves to create shear stress in visco-elastic material in contact with damping body 69. This produces a rapid decrease in vibration generated by external sources. At the same time, the resonant frequency can be increased greatly. By increasing the resonant frequency, a high tracking servo bandwidth can be achieved and high speed following and fine positioning becomes possible. Thus, higher density data tracks, i.e., a high recording density can also be achieved.

A drive section 73, such as a stepper motor or displacement regulating step limits the displacement direction of damping body 69. In other words, displacement in directions other than the required displacement of magnetic head chip 61 can be either prevented or controlled. For example, angular displacement, displacement in the zenith direction, displacement in the perpendicular direction, or rotation may be either prevented or controlled. Magnetic head 60 prevents unnecessary vibration and unnecessary resonance points concerning these directions that occur due to limitations of part accuracy, assembly accuracy, and the like.

FIGS. 14-17 illustrate a magnetic head for which damping properties or the amount of damping can be easily adjusted. In general, a linear magnetic tape device may comprise the magnetic head which follows sideways movement of tape with multiple tracks in the lengthwise direction. The magnetic head comprises twin bimodal actuators, a damping step, a magnetic head chip, and damping body that allows easy adjustment the damping property. In particular, the damping body has a damping bar which projects from both ends of the magnetic head chip on the same line as the center of gravity of the magnetic head chip. The magnetic head chip comprises multiple magnetic head elements and is mechanically bonded between the free ends of the pair of bimodal elements. The damping step is set up at the fixed ends of the pair of bimodal actuators and the head chip. In addition, the damping step has a movable holder which holds the visco-elastic material that comes in contact with the damping body and also allows the contact area between the visco-elastic material and the damping body to be adjusted. Head damping is achieved by contact between the visco-elastic material and the damping body.

The damping property adjustment step allows the desired damping properties to be achieved. Since both attachment points of the magnetic head chip can be adjusted independently, balancing of the damping properties is possible and damping property adjustment is easier. Since the damping bar is set up on the same line as the center of gravity of the magnetic head chip, unnecessary moment will not be produced. Also, since the damping adjustment is arranged at the damping bar projecting from both ends of the magnetic head chip, the damping adjustment does not require space on the magnetic head chip. Thus, the magnetic head can be miniaturized. Moreover, the fit between the damping bar and the visco-elastic material is good and unevenness in damping properties is small. Furthermore, by increasing the surface area of the damping bar, the contact area between the damping bar and visco-elastic material is increased and the amount of damping can be increased.

Figure 14A:
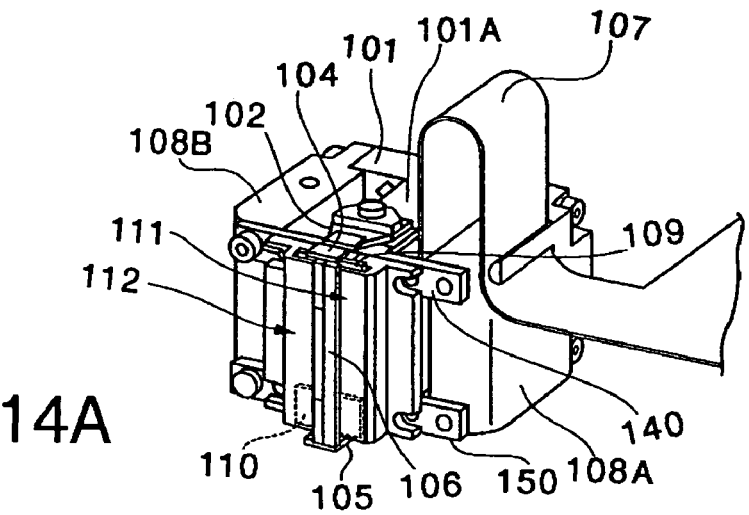
FIGS. 14A-14C illustrate a magnetic head that is supported by a damping structure suitable for twin bimodal actuator for improving high speed response by enlarging the servo range in accordance with an embodiment of the invention.
Figure 14B:
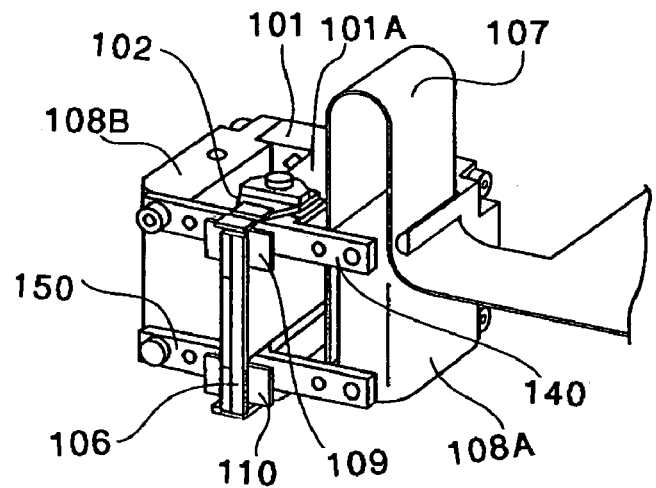
Figure 14C:
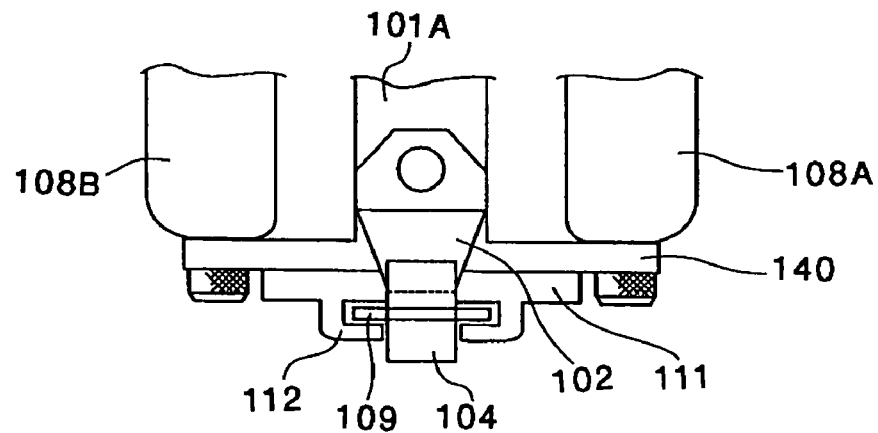
Figure 15:
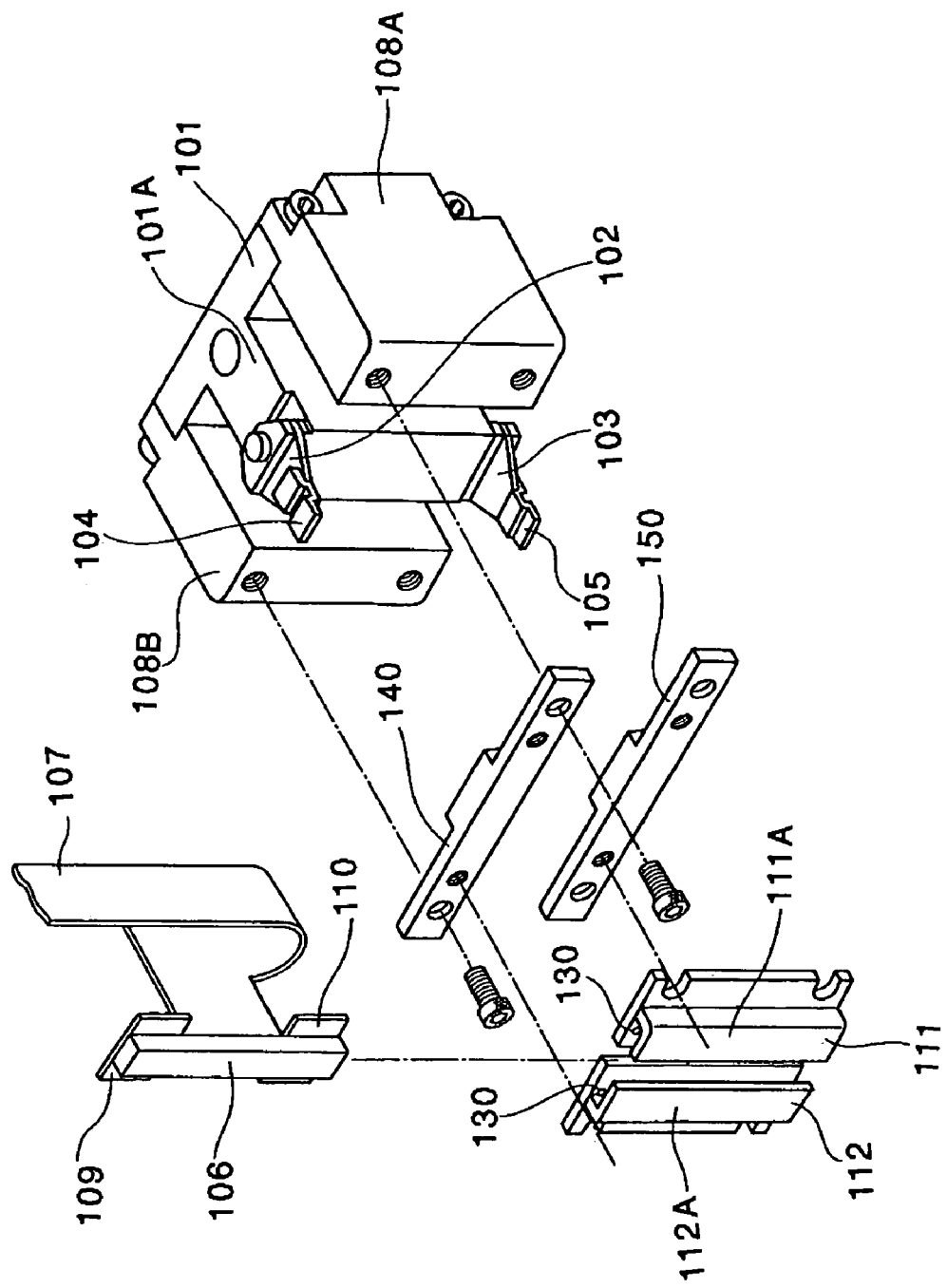
FIG. 15 is an exploded view of the magnetic head of FIGS. 14A-14C.

FIG. 14A illustrates a magnetic head 100 for improving high speed response by enlarging the servo range in accordance with an embodiment of the invention. FIG. 14B illustrates magnetic head 100 with damping covers 111 and 112 removed. FIG. 14C is a top view of magnetic head 100. FIG. 15 is an exploded view of magnetic head 100.

Magnetic head 100 includes a base block 101, also referred to as a carrier, that fixes the two up and down pieces of bimodal actuators 102 and 103 and regulates the space between bimodal actuators 102 and 103. Base block 101 comprises center part 101A. Both ends of center part 101A base block 101 are screwed to bimodal actuators 102 and 103. Bimodal actuators 102 and 103 are displaced by applying voltage. The free end of bimodal actuators 102 and 103 are attached to flexible chip bases 104 and 105, which are bent in the center. Magnetic head chip 106 has multiple magnetic head elements and both ends of magnetic head chip 106 are mechanically bonded between the ends of chip bases 104 and 105.

Wiring from the output terminals of the magnetic head chip elements on magnetic head chip 106 are connected to a flexible wiring substrate 107 called a flexible printed circuit (FPC). Recording and playback data for each channel of magnetic head 106 is performed through FPC 107. Support walls 108A and 108B partially fix FPC 107 and are arranged to face each other with a predetermined distance between each other and are attached to both sides of center part 101A base block 101. The side surfaces with the magnetic head elements on head chip 106 are arranged facing each other on the magnetic tape (not shown).

The surface near chip bases 104 and 105 that is opposite from the surface where the magnetic head elements are arranged on head chip 106 are attached to, for example, rectangular damping plates or damping bodies 109 and 110. Damping plates 109 and 110 are covered by damping covers 111 and 112 that can be moved in the tape running direction. Damping covers 111 and 112 allow damping property adjustment and may be referred to as a movable holder. The inner shape of damping covers 111 and 112 is a flat D shape surrounding damping plates 109 and 110. Specifically, damping covers 111 and 112 may comprise frames 111A and 112A that form the ⊃ shape.

Visco-elastic material or damping material 130, such as silicone resin, is deposited between the inner walls of damping plates 109 and 110 and damping covers 111 and 112 so that damping plates 109 and 110 contact damping material 130.

Upper and lower support plates 140 and 150 are arranged between damping covers 111 and 112 and center part 101A of base block 101 in the tape running direction. Support plates 140 and 150 are screwed along the front side of FPC support walls 108A and 108B. Damping covers 111 and 112 are attached to support plates 140 and 150 to enable support plates 140 and 150 to slide thereby allowing the contact area between damping plates 109 and 110 and damping material 130 to be adjusted. After adjustment, the damping covers 111 and 112 are fixed to support plates 140 and 150 by, for example, screws or other appropriate fastening devices. Consequently, the damping properties may be easily adjusted.

When the tracking control signal from the servo signals on the magnetic tape (not shown) is applied to bimodal actuators 102 and 103, the free ends are displaced up and down by the piezoelectric effect. This displacement is transmitted to head chip 106 through chip bases 104 and 105 causing head chip 106 to be driven up and down. In this manner, head chip 106 may be finely positioned in the track width direction, and the magnetic head element can follow each data track. Damping plates 109 and 110 are also moved as a result of the displacement. Relative motion between damping plates 109 and 110 and damping material 130 creates shear stress, which damps head motion.

The resulting damping property may be controlled by the amount of damping material 130. However, since it is not trivial to change the amount of damping material 130 once damping material 130 has been deposited, the damping property may be adjusted by adjusting pressure between the left and right damping covers 111 and 112, respectively, and damping material 130. Specifically, the pressure between the left and right damping covers 111 and 112 may be adjusted independently. This adjustment can be done easily while evaluating the damping properties.

Moreover, since damping covers 111 and 112 form an upper section that surrounds upper damping plate 109 and a lower section that surrounds lower damping plate 110, adjustment can be done independently. Thus, it is possible to balance damping properties between the upper side and lower side. If the damping properties cannot be adjusted after depositing damping material 130, the damping property may be adjusted by adjusting the amount of damping material 130 or area of the damping plates 109 and 110. However, it may be difficult to determine the center of gravity of damping plates 109 and 110 or adjust damping material 130. In addition, any unbalance will produce unnecessary moment. Moreover, to further reduce the amount of damping either of damping plates 109 or 110, may be removed thereby by reducing the amount of damping to half.

Figure 16A:
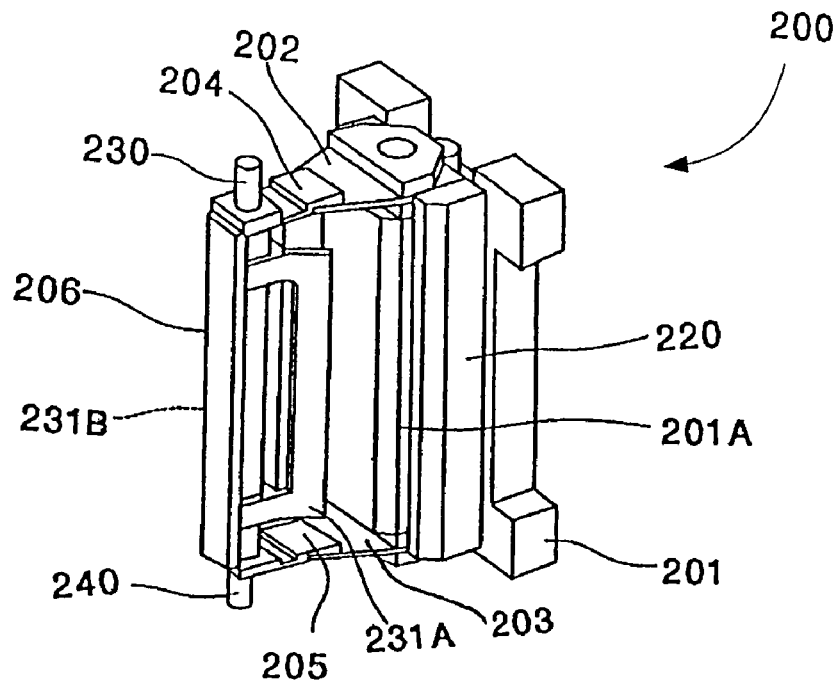
FIGS. 16A and 16B illustrate another example of the magnetic head according to an embodiment of the invention.
Figure 16B:
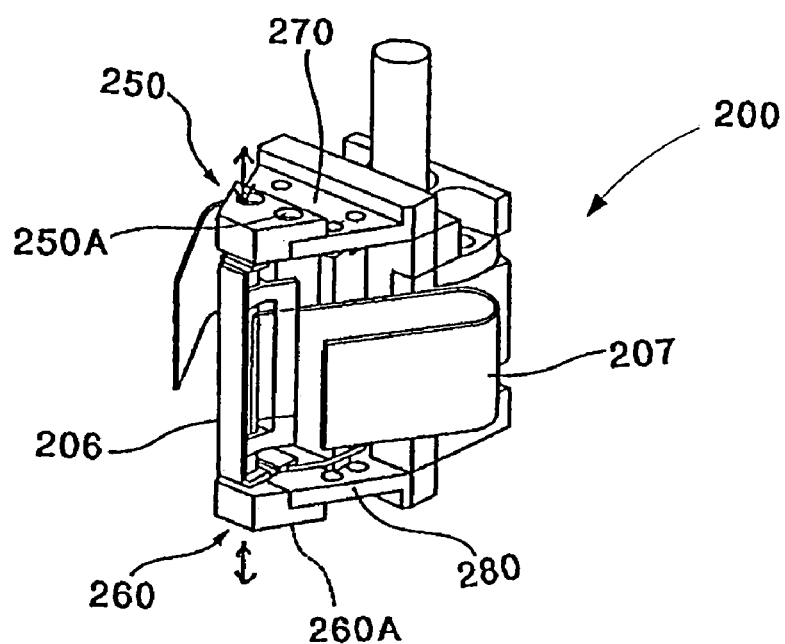
Figure 17:
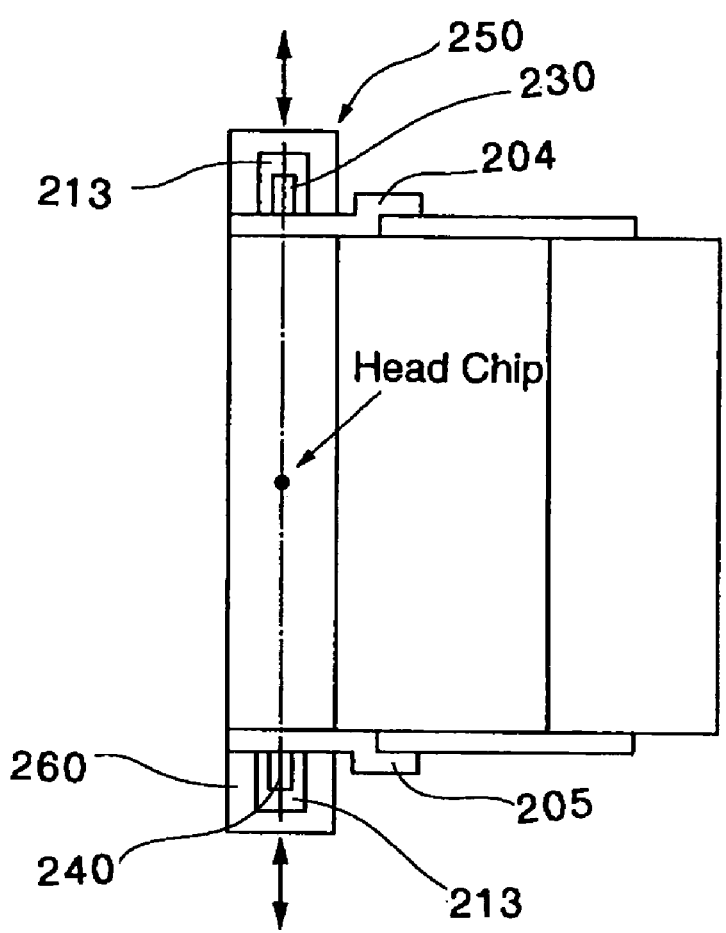
FIG. 17 is a cross-section view of the magnetic head of FIGS. 16A and 16B.

FIG. 16A illustrates magnetic head 200 for improving high speed response by enlarging the servo range in accordance with another embodiment of the invention. In particular, FIG. 16A illustrates magnetic head 200 with damping covers 250 and 260 removed. FIG. 16B illustrates magnetic head 200 with damping covers 250 and 260 installed. FIG. 17 is a cross-section view of magnetic head 200.

Magnetic head 200 includes base block 201 and bimodal actuators 202 and 203. Base block 201 comprises a center part 201A and bimodal actuators 202 and 203 may be attached to the upper and lower end of center part 201A by screws or other suitable fastening devices. Base block 201 and bimodal actuators 202 and 203 may be similar to base block 101 and bimodal actuators 103 and 104, respectively.

Center part 201A of base block 201 has staples 220 for regulating the position of bimodal actuators 202 and 203. Bimodal actuators 202 and 203 may be at least as large as bimodal actuators 102 and 103. In any case, the free ends of bimodal actuators 202 and 203 are bonded to the upper and lower ends of magnetic head chip 206 through chip bases 204 and 205. Magnetic head chip 206 and chip bases 204 and 205 may be similar to magnetic head chip 106 and chip bases 104 and 105. Moreover, the free ends of bimodal actuators 202 and 203 may be bonded to the upper and lower surfaces of magnetic head chip 206 through chip bases 204 and 205 in the same manner as previously described with respect to magnetic head 100 in FIGS. 2-4.

Damping bars 230 and 240 project form magnetic head chip 206 on the same line as the center of gravity of magnetic head chip 206. In addition, the inside of damping covers 250 and 260 form a cylinder shape. Damping covers 250 and 260 may form a movable holder that has a hole for attaching damping bars 230 and 240. Magnetic head 200 may also include covers 270 and 280 for bimodal actuators 202 and 203. Damping material 213, such as silicone resin as previously described, may be deposited in each hole of damping covers 250 and 260 so that damping bars 230 and 240 contact damping material 213.

Each end of damping bars 230 and 240 may extend into magnetic head chip 206 through chip bases 204 and 205. Damping covers 250 and 260 are arranged in the axial direction of the damping bars 230 and 240 to allow damping bars 230 and 240 to move freely. Thus, the contact area between damping bars 230 and 240 and damping material 213 can be adjusted.

Damping covers 250 and 260 can be attached by inserting a spring (not shown) and tightening screws on covers 270 and 280 through screw holes 250A and 260A in the damping covers 250 and 260, respectively. The amount of movement of damping bars 230 and 240 in the axial direction is adjusted by adjusting the screws.

Wiring from the output terminals of the magnetic head chip elements on magnetic head chip 206 are connected to flexible wiring substrate or FPC 207. Recording and playback for each channel of magnetic head 206 is performed through FPC 207. Holders 231A and 231B are set up on both sides of magnetic head chip 206 and maintain FPC 207 similar to FIGS. 14 and 15.

Damping covers 250 and 260 can be adjusted as described with respect to FIG. 14 and FIG. 15 to adjust the damping properties after depositing damping material 213. The amount of damping by upper damping cover 250 and lower damping cover 260 can be independently adjusted. Furthermore, the upper and lower damping properties may be balanced. For example, damping bars 230 and 240 may be placed on substantially the same line as the center of gravity of magnetic head chip 206. Therefore, unnecessary moment may not be generated. However, if damping bars 230 and 240 are not aligned with the center of gravity of magnetic head chip 206, rotation may occur since the centers of gravity are separated by a distance. Since head chip 206 and damping plates 209 and 210 are both regarded as structural elements, the influence of this rotation moment is small. In addition, since damping covers 250 and 260 are arranged at both ends of damping bars 230 and 240, which project from both ends of the head chip 61, additional parts in the tape running direction of magnetic head chip 206 are not needed, and the equipment can be miniaturized.

In particular, damping bars 230 and 240 having an R-shape fit damping material 213 better than bars with flat ends. Moreover, damping bars having an R shape cause less unevenness in damping properties over one displacement cycle. In some embodiments, more than one damping bar may be used. By using multiple bars, surface area is increased and the amount of damping can be increased. To further reduce the amount of damping than by only adjusting damping covers 250 and 260, either damping bar 230 or 240 can be removed. A similar effect can be achieved by removing damping material 213.

Various embodiments of the invention have been described. These and other embodiments are within the scope of the following claims.

The invention claimed is:

1. A magnetic head device for recording and playing back information on magnetic tape comprising:
   a multi channel magnetic head chip with multiple magnetic head elements;
   a tracking structure comprising a twin bimodal type actuator wherein the twin bimodal type actuator includes a pair of bimodal elements that are positioned to face each other, wherein the magnetic head chip is placed between the free ends of the pair of bimodal elements and is mechanically bonded to the pair of bimodal elements, and wherein application of a tracking control signal to the pair of bimodal elements displaces the magnetic head chip; and
   a damping structure comprising a structure that holds visco-elastic materials and a damping body inserted in the visco-elastic materials and that is mechanically connected to the magnetic head chip.

2. The device of claim 1, wherein the damping structure suppresses vibration due to shear stress between the visco-elastic material and the damping body.

3. The device of claim 1, wherein the damping body comprises a pair of symmetrical or asymmetrical damping bodies, wherein one of the pair of damping bodies is located at each end of the multi channel direction of the magnetic head chip.

4. The device of claim 1, wherein the damping structure generates shear stress between the damping body and the visco-elastic material, wherein a direction of the shear stress is different from a displacement direction of the magnetic head chip.

5. The device of claim 1, wherein the damping structure includes a displacement regulating step that limits a displacement direction of the damping body to a predetermined direction.

6. The device of claim 1, wherein the damping structure further comprises a displacement regulating step having grooves or projections formed on walls along a displacement direction of the damping body that contact the visco-elastic material.

7. The device of claim 5, wherein displacement of the magnetic head chip at an angle is restricted by the displacement direction of the regulating step.

8. The device of claim 5, wherein displacement in a perpendicular direction of the magnetic head chip is restricted by the displacement regulating step.

9. The device of claim 1, further comprising a damping step at the fixed end of the pair of bimodal elements that allows adjustment of the damping properties.

10. The device of claim 9, wherein the damping body comprises a damping bar that projects from both ends of the magnetic head chip on the same line as a center of gravity of the magnetic head chip.

11. The device of claim 9, wherein the damping step includes a movable holder that holds the visco-elastic materials that come into contact with the damping body and adjusts the contact area between the visco-elastic material and damping body.

12. The device of claim 10, wherein the damping property adjusting step has a movable holder which holds the visco-elastic materials that come into contact with the damping body and adjusts the contact area between the visco-elastic materials and damping body.

13. The device of claim 11, wherein the damping body comprises a damping plate that is attached on the opposite side from the magnetic head side of the head chip, wherein the holder moves along a surface of the damping plate.

14. The device of claim 12, wherein the holder moves in the axial direction of the damping bar.

15. The device of claim 10, wherein a top end of the damping bar is R shaped.

16. The device of claim 12, wherein a top end of the damping bar is R shaped.

17. The device of claim 14, wherein a top end of the damping bar is R shaped.

18. The device of claim 10, wherein the damping body comprises multiple damping bars.

19. The device of claim 12, wherein the damping body comprises multiple damping bars.

20. A linear tape drive system that uses linear tape with multiple magnetic tracks extending in the lengthwise direction formed across the width of a magnetic tape comprising:
a tape cassette around which the magnetic tape is wound;
a magnetic head device comprising a multi channel magnetic head chip with multiple magnetic head elements, a twin bimodal type actuator, and a damping structure comprising a structure that holds visco-elastic materials and a damping body inserted in the visco-elastic materials that is mechanically connected to the magnetic head chip; and
a magnetic tape guide that guides the magnetic tape drawn from the tape cassette to the magnetic head device;
wherein the twin bimodal type actuator includes a pair of bimodal elements that are positioned to face each other, the magnetic head chip is placed between the free ends of the pair of bimodal elements and is mechanically bonded to the pair of bimodal elements, and wherein application of a tracking control signal to the pair of bimodal elements displaces the magnetic head chip.

* * * * *

UNITED STATES PATENT AND TRADEMARK OFFICE
CERTIFICATE OF CORRECTION

PATENT NO. : 7,339,768 B2 Page 1 of 1
APPLICATION NO. : 11/041900
DATED : March 4, 2008
INVENTOR(S) : Ito et al.

It is certified that error appears in the above-identified patent and that said Letters Patent is hereby corrected as shown below:

On Column 9, line 14, delete "80-"

Signed and Sealed this

Twenty-sixth Day of August, 2008

JON W. DUDAS
*Director of the United States Patent and Trademark Office*